[125]

SAMUEL KINGSLAND.

Improvement in Wood Bending Machines.

No. 4,553

Reissued Sep. 12, 1871.

Witnesses

William Case

A McMillen

Inventor

Samuel Kingsland by atty A Pollok

AM. PHOTO-LITHOGRAPHIC CO. N.Y. (OSBORNE'S PROCESS.)

UNITED STATES PATENT OFFICE.

SAMUEL KINGSLAND, OF COUNCIL BLUFFS, IOWA, ASSIGNOR TO HENRY OCORR.

IMPROVEMENT IN WOOD-BENDING MACHINES.

Specification forming part of Letters Patent No. 35,983, dated July 22, 1862; reissue No. 4,553, dated September 12, 1871.

*To all whom it may concern:*

Be it known that I, SAMUEL KINGSLAND, formerly of the town of Lyndon, county of Juneau and State of Wisconsin, now of Council Bluffs, in the county of Pottawattamie and State of Iowa, have invented new and useful Improvements in Wood-Bending Machines, of which the following is a specification:

My invention consists principally in a method of bending wood by the employment of a heated form over or upon which the wood, either in an unseasoned state, or, if seasoned, after having been soaked or steamed, is bent in any desired shape by suitable machinery, and is there retained until, by a process of seasoning or evaporation induced by the heat given out from the form, it is caused to permanently retain the form or shape imparted to it by the bending process. My invention may be further stated to consist of a wood-bending form, consisting of a hollow metallic structure, or a structure with a chamber within it, to receive the heating agent employed to impart the necessary heat to the wood bent over or upon said form, and with apertures for the entrance and discharge of the heating agent. The form, of course, will be of any suitable shape and size to adapt it for the purposes for which it is used and to impart to the wood the conformation desired; the gist of my invention consisting in the employment, in the process of wood-bending, of a heated metallic form for the purposes above stated.

To fully illustrate my invention, I have represented in the accompanying drawing one form of apparatus in which my said invention may be carried into effect.

Figure 1:
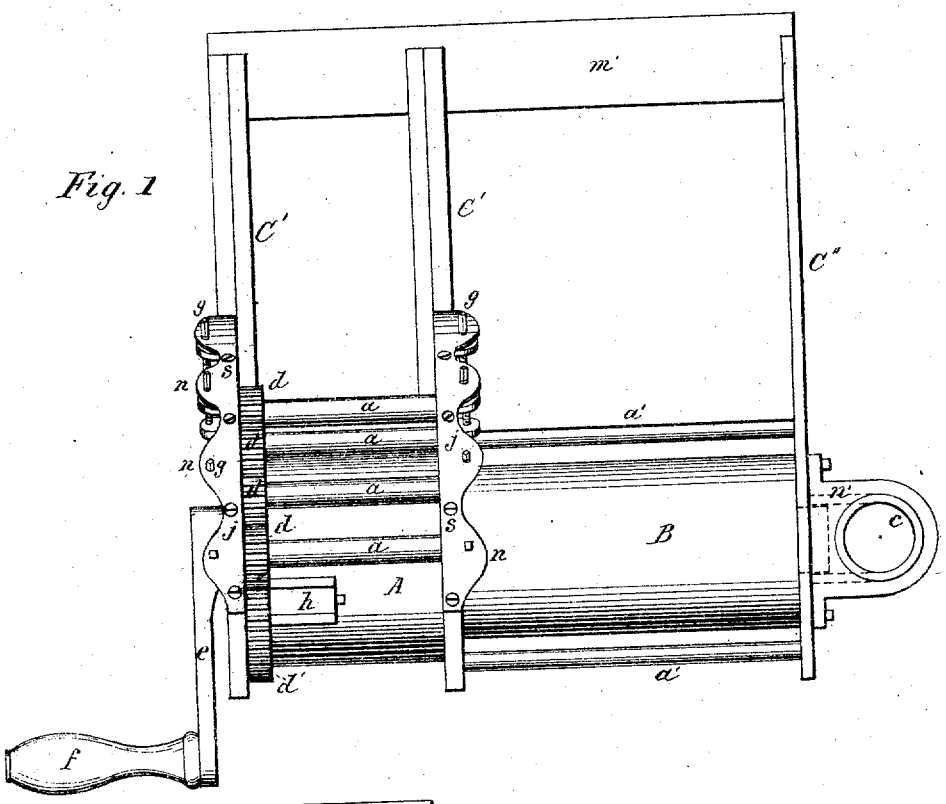
Figure 2:
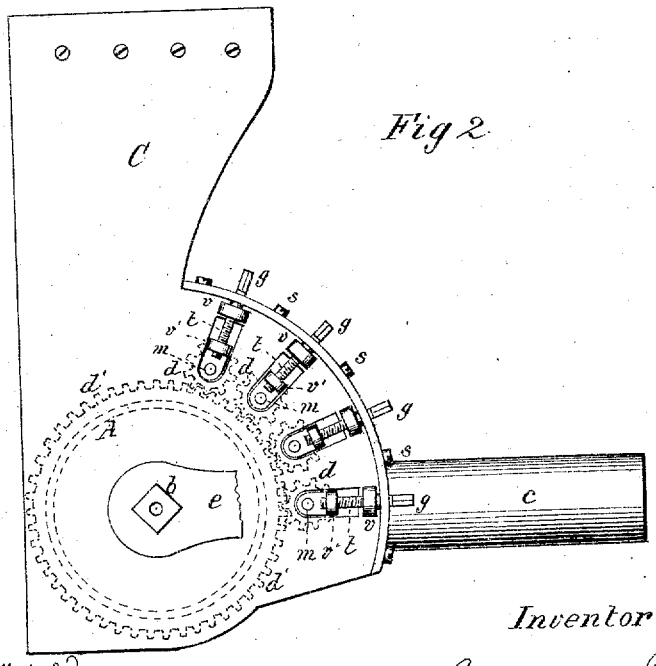

A is a form, of wrought or cast-iron, or other suitable material, of any desired shape and size, or different parts of it may be of different sizes, as represented in Figure 1, where B, is a smaller form, constituting a continuation of the form A. This may again be subdivided so as to obtain a series of hollow forms, the one connected or communicating with the other, so that the heating agent employed may pass freely from one to the other throughout the whole series. In case the forms are to be heated by fuel placed within them or any one of them an opening is provided in one of the forms A, at any suitable point, as at *h*, for the introduction of fuel, said opening being provided with a door or other suitable means for closing it tightly against the escape of the fuel. In the present apparatus the form is of a cylindrical shape, and is arranged to revolve or turn upon its axis, and it therefore is provided with journals mounted in suitable frames or bearings C C′ C″, in which the said journals may turn, the rotary movement being effected by means of a crank, *e*, and handle *f*. Through the axis of the journal upon which the crank is mounted is an aperture, *b*, for the purpose of furnishing ventilation to the fire-chamber within said form, which chamber extends the entire length of said form, and is provided at the other end with a suitable pipe or chimney to secure the necessary draught, and to convey away through the roof of the building or into the chimney the smoke or gases from within the form. The lower extremity of this chimney or pipe is fitted over a projection of the form, which revolves with it, so that the said projection may revolve within the pipe. At suitable points on the exterior of the said cylinder I provide appropriate gearing *d′*, as represented in Figs. 1 and 2. The plates C C′ C″, or any desired series of them, serve as the frame upon which the cylinder and other mechanism of my invention are supported. The outer plate C, as represented in the drawing, is formed with a curved edge corresponding with the form of the cylinder A and extending above the cylinder, as represented in Fig. 2, for the purpose of carrying a series of feed-rollers with their gearing, set-screws, and bearings, as shown. Upon the curved edge of said plate C is secured, by screws *s*, a plate, *j*, with its corrugated or projecting edges *n*. Corresponding to said projecting edges *n* of said plate *j*, and immediately under them, are projections *v*, fastened securely to or cast with the said plate C. Immediately under the projections *v* are cut in said plate C the beveled slots *t*, into which are fitted the sliding boxes *m*, provided at their upper ends with projections *v′*. The slots *t* are cut with beveled edges inwardly, and the sliding boxes *m* have their corresponding beveled edges, so that the said boxes cannot pass through said slot outwardly, but are perfectly free to move up and down therein, and are removable inwardly. Through the projections *n*, *v*, and *v′* are passed the set-screws *g* for the purpose of adjusting the sliding boxes *m* up and down in the slots *t*, as may be desired. Near the center of the sliding boxes *m* are suitable holes or bearings to receive the journals of the feed-rollers *a*, as shown in Fig. 2. The feed-rollers *a* are provided with pinions *d*, which mesh into and are operated by the gearing *d'* on the form. A corresponding plate, C', is placed at the other end of form A, and is provided with a plate, *j*, with its projections *n*, beveled slots *t*, sliding boxes *m* with their bearings to receive the other end of the feed-rollers *n*, projections *v* and *v'*, and set-screws *g* for the support and adjustment of said feed-rollers, as represented in Fig. 1. A plate, C'', is shown in the drawing as a support for the end of the form B, and is provided with a suitable bearing, through which passes the projection to receive the pipe C', and to the upper edge of which is secured a support, *n*, through which, in its upward angle, passes said pipe. The plates C C' C'' are secured firmly in the desired position by cross-braces *a' a'* suitably bolted, and a cross-tie of timber, *m'*, at their outer ends. The cross-braces *a'* also serve as a fulcrum to receive the end of the wood to be bent over the part of the cylinder B by hand manipulation or other suitable means.

The operation of the machine with reference to the feed-rollers is as follows: After sufficiently heating the form or forms A B the wood to be bent is inserted in an unseasoned or soaked state between the feed-rollers *a* and the heated form, the said rollers having been properly adjusted by means of said screws; then, by revolving the crank, the wood is drawn in between the heated form and feed-rollers and around the form, and is there retained until sufficiently seasoned to retain its new shape, this being effected in a short time. The crank is then turned back so as to discharge the bent wood preparatory to a repetition of the operation. Or, for light work, the bending process may be conducted by hand manipulation, as stated, the bent wood being retained in place by any suitable fastening during the time required for the drying or seasoning process.

It is manifest that the invention, so far as the heated form is concerned, does not depend upon any particular shape or configuration of the form, nor upon the special mechanical devices herein shown and described for bending and retaining the wood upon it.

The peculiar advantage of my invention consists in the use of a heated form having its external walls of suitable form for bending wood into any desired shape, whereby the steaming process preparatory to wood-bending is avoided and any desired form is permanently given the wood in a very few moments of time. The wood passes into the machine in an unseasoned or soaked state and is delivered therefrom, without material delay, permanently bent and in a dry and seasoned condition. I thus supply an article which will be proof against weather and will retain its new form under every condition and use.

Having thus described my invention, what I desire to secure by Letters Patent is—

1. In the process of bending wood the employment of a heated metallic form, over and upon which the wood is bent and shaped, substantially as herein shown and set forth.

2. A wood-bending form, consisting of a hollow metallic structure, of suitable shape to impart the desired configuration to the wood bent over upon, it and provided with apertures or openings for the entrance and discharge of the agent by means of which heat is imparted to its metallic wall, substantially as herein shown and described.

3. The combination of a series of hollow metallic wood-bending forms, so connecting or communicating with each other that the heating agent, when introduced into one of said forms, may be free to pass or diffuse itself through the whole series, substantially as herein shown and set forth.

4. The combination, with the wood-bending form or forms, of the frame or frames for supporting the same, and the means for bending the wood upon the forms carried by said frame or frames, and constructed and arranged for operation substantially as herein shown and described.

5. A wood-bending mechanism, composed of a hollow, internally-heated form, and means for bending and retaining upon said form the wood to be shaped, as herein shown and described.

In testimony whereof I have hereunto set my hand in the presence of two subscribing witnesses.

Witnesses: SAMUEL KINGSLAND.
W. F. LAPP,
J. LYMAN. (125.)